US012467762B1

(12) United States Patent
Salter et al.

(10) Patent No.: US 12,467,762 B1
(45) Date of Patent: Nov. 11, 2025

(54) VEHICLE HMI ACTUATION

(71) Applicant: Ford Global Technologies, LLC, Dearborn, MI (US)

(72) Inventors: Stuart C. Salter, White Lake, MI (US); Brendan Francis Diamond, Naples, FL (US); Keith Weston, Canton, MI (US); Kendra White, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 44 days.

(21) Appl. No.: 18/760,169

(22) Filed: Jul. 1, 2024

(51) Int. Cl.
*B60W 60/00* (2020.01)
*G01C 21/36* (2006.01)
*A61B 5/00* (2006.01)

(52) U.S. Cl.
CPC ... *G01C 21/3697* (2013.01); *B60W 60/00133* (2020.02); *A61B 5/4809* (2013.01)

(58) Field of Classification Search
CPC .......... B60W 60/00133; A61B 5/6893; A61B 5/4809; A61B 5/4815; A61B 5/4812; G01C 21/3697
See application file for complete search history.

(56) References Cited

U.S. PATENT DOCUMENTS

| 9,500,489 | B1 | 11/2016 | Ng | |
|---|---|---|---|---|
| 9,615,787 | B2 * | 4/2017 | Peterson | A61B 5/746 |
| 10,004,873 | B1 * | 6/2018 | Hur | A61B 5/6893 |
| 10,303,961 | B1 * | 5/2019 | Stoffel | H04W 4/44 |
| 2018/0081324 | A1 * | 3/2018 | Sharoni | G04G 13/021 |
| 2020/0283013 | A1 * | 9/2020 | Saito | B60W 60/00133 |
| 2020/0378778 | A1 * | 12/2020 | Glazberg | G05D 1/0088 |
| 2025/0202779 | A1 * | 6/2025 | Aldhamdi | H04L 41/16 |

FOREIGN PATENT DOCUMENTS

| CN | 106603827 A | * | 4/2017 | ........ H04M 1/72451 |
|---|---|---|---|---|
| CN | 116322858 A | | 6/2023 | |
| DE | 102017214365 A1 | * | 2/2019 | .......... A61B 5/0205 |
| DE | 102018131456 A1 | * | 6/2020 | ............. G04G 11/00 |
| FR | 3044803 A1 | * | 6/2017 | ............... A61B 5/18 |
| FR | 3114275 A1 | * | 3/2022 | .......... B60N 2/0244 |
| JP | 2006076461 A | * | 3/2006 | |
| JP | 2010018055 A | * | 1/2010 | |
| JP | 5028071 B2 | | 9/2012 | |
| JP | 5340660 B2 | | 11/2013 | |
| JP | 2022074193 A | * | 5/2022 | |
| WO | 2023063214 A1 | | 4/2023 | |

OTHER PUBLICATIONS

FR 3114275 A1—Machine Translation (Year: 2022).*
DE 102017214365 A1—Machine Translation (Year: 2019).*
CN 106603827 A—Machine Translation (Year: 2017).*
DE 102018131456 A1—Machine Translation (Year: 2020).*
FR 3044803 A1—Machine Translation (Year: 2017).*
JP 2006076461 A—Machine Translation (Year: 2006).*
JP 2010018055 A—Machine Translation (Year: 2010).*
JP 2022074193 A—Machine Translation (Year: 2022).*

* cited by examiner

*Primary Examiner* — Dino Kujundzic
(74) *Attorney, Agent, or Firm* — Frank Lollo; Brooks Kushman P.C.

(57) ABSTRACT

A system comprises a computer having a processor and a memory. The memory stores instructions executable by the processor to determine a wakeup time for an occupant of a vehicle based on a destination and an object in an interior of the vehicle, and actuate a vehicle component to awaken the occupant.

20 Claims, 3 Drawing Sheets

VEHICLE HMI ACTUATION

BACKGROUND

Vehicles can include features to operate a vehicle and/or actuate vehicle components based on inputs in addition to and/or provided as an alternative to operator input. Further, vehicles can include human machine interfaces (HMI's) to receive user inputs and/or to provide outputs for users such as vehicle operators and/or other occupants.

DETAILED DESCRIPTION

Figure 1:
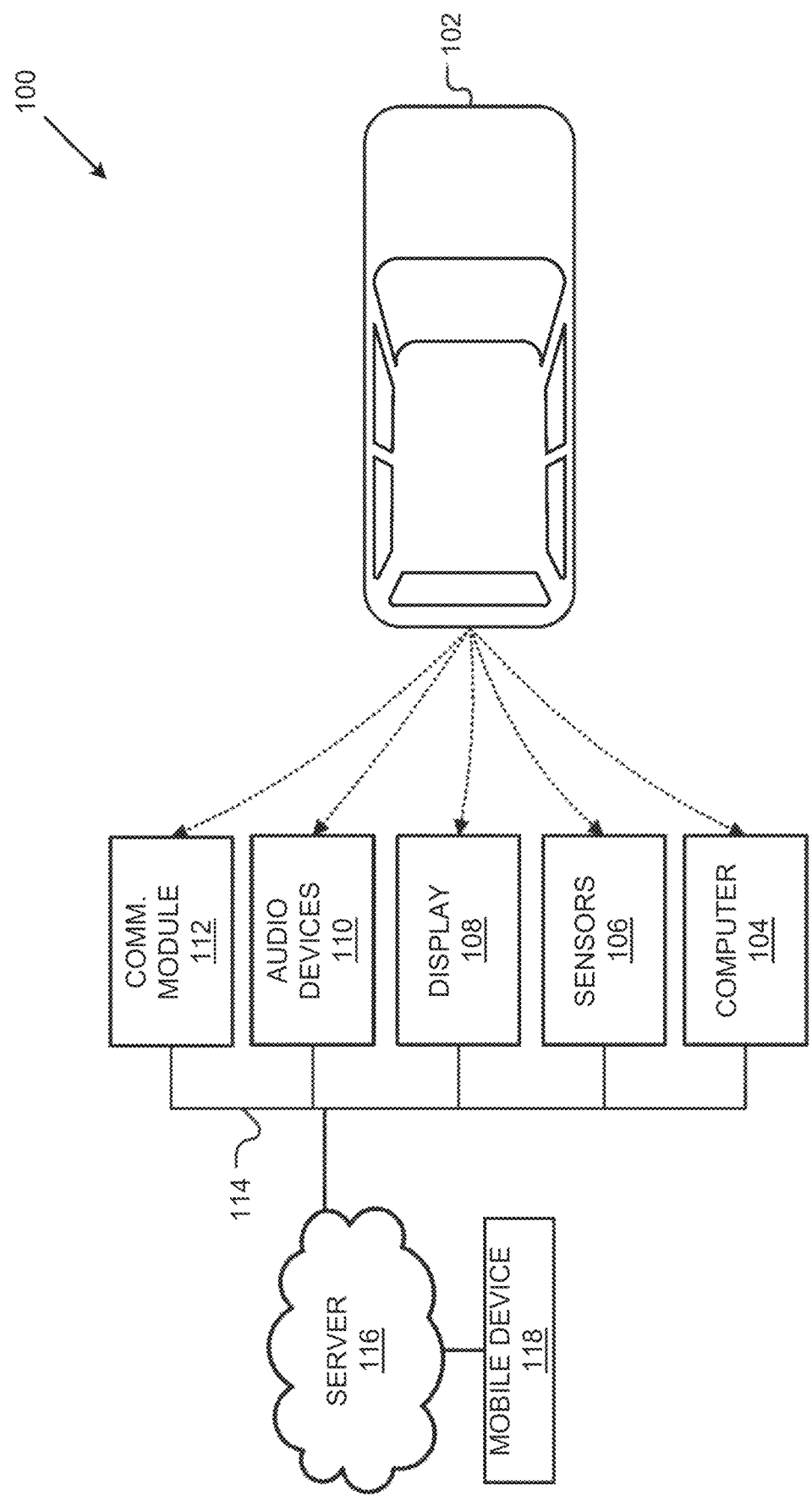
FIG. 1 is a block diagram of an example vehicle system.

A computer in a vehicle may receive data indicating a destination of a user, data about a user (e.g. a sleep state), and/or data about objects associated with a user. The computer may calculate an alarm time based on the data and, once the alarm time is reached, actuate a vehicle component to awaken the user.

Accordingly, included in the present disclosure is a system comprising a computer having a processor and a memory, the memory storing instructions executable by the processor to: determine a wakeup time for an occupant of a vehicle based on a destination and an object in an interior of the vehicle, and actuate a vehicle component to awaken the occupant.

The object may be detected by a vehicle sensor.

A presence of the object in the interior of the vehicle may be determined based on user input.

The wakeup time may be determined based on a classification of the object.

The wakeup time may be determined based on a condition specified by user input.

The wakeup time may be determined based on user input of a desired difference between the wakeup time and an estimated time of arrival at the destination.

The wakeup time may be determined based on a condition specified by user data obtained from a mobile device.

Determining the wakeup time based on the destination may include predicting a time of arrival at the destination.

Determining the wakeup time based on the destination may include predicting a time for preparing for arrival at the destination.

Determining the wakeup time based on the destination may include determining a classification of the destination.

The occupant may be one of a plurality of occupants in the vehicle, and a second wakeup time for a second occupant in the vehicle may be determined.

The second wakeup time for the second occupant may be based on a predicted second time of arrival at a second destination.

The wakeup time may be determined based on a number of occupants in the vehicle.

The wakeup time may be determined further based on one or more of a state of the occupant, traffic data, and historical data.

The wakeup time may be determined further based on a sleep state of the occupant.

A method, comprises: determining a wakeup time for an occupant of a vehicle based on a destination and an object in an interior of the vehicle, and actuating a vehicle component to awaken the occupant.

The wakeup time may be determined based on a classification of the object.

The wakeup time may be determined based on user input of a desired difference between the wakeup time and an estimated time of arrival at the destination.

The wakeup time may be determined based on a condition specified by user data obtained from a mobile device.

The occupant may be one of a plurality of occupants in the vehicle, and a second wakeup time for a second occupant in the vehicle may be determined.

With reference to the Figures, wherein like numerals indicate like parts throughout the several views, a vehicle system 100 includes a computer 104, including a processor and a memory, for a vehicle 102. The memory stores instructions executable by the processor, including instructions to, determine a wakeup time for an occupant of a vehicle based on a destination and an object in an interior of the vehicle; and actuate a vehicle component to awaken the occupant.

Exemplary System Elements

With reference to FIG. 1, a vehicle 102 includes a vehicle system 100. The vehicle system 100 includes a computer 104 having a memory that includes instructions executable by the computer 104 to carry out processes and operations including as described herein. The computer 104 may be communicatively coupled via a vehicle communication network 114 with sensors 106, displays 108, audio output devices 110, and a communication module 112. The vehicle 102 includes various other components, such as a steering, propulsion, and braking systems. The vehicle 102 may be a passenger or commercial automobile such as a car, a truck, a sport utility vehicle, a crossover, a van, a minivan, a taxi, a bus, ICE (Internal Combustion Engine), BEV (Battery Electric Vehicle), hybrid, a PHEV (Plug-in Hybrid Electric Vehicle), etc.

As mentioned above, the vehicle computer 104 includes a processor and a memory. The memory includes one or more forms of computer readable media, and stores instructions executable by the processor for performing various operations, including as disclosed herein. For example, the computer 104 can be a generic computer with a processor and memory as described above and/or may include an electronic control unit ECU or controller for a specific function or set of functions, and/or a dedicated electronic circuit including an ASIC (application specific integrated circuit) that is manufactured for a particular operation (e.g., an ASIC for processing sensor data and/or communicating the sensor data). In another example, the computer 104 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design to describe digital and mixed-signal systems such as FPGA and ASIC. For example, an ASIC is manufactured based on VHDL programming provided pre-manufacturing, whereas logical components inside an FPGA may be configured based on VHDL programming (e.g. stored in a memory electrically connected to the FPGA circuit). In some examples, a combination of processor(s), ASIC(s), and/or FPGA circuits may be included in a computer 104. The computer 104 may be multiple computers coupled together.

The memory can be of any type (e.g., hard disk drives, solid state drives, servers, or any volatile or non-volatile media). The memory can store the collected data sent from the sensors 106. The memory can be a separate device from the computer 104, and the computer 104 can retrieve information stored by the memory via the network 114 in the vehicle 102 (e.g., over a CAN bus, a wireless network, etc.) Alternatively or additionally, the memory can be part of the computer 104 (e.g., as a memory of the computer 104).

The computer 104 may include programming to operate one or more of vehicle components such as propulsion (e.g., control of speed in the vehicle 102 by controlling one or more of an internal combustion engine, electric motor, hybrid engine, etc.), steering, braking, interior and/or exterior lights, displays 108, audio output devices 110, etc., as well as to determine whether and when the computer 104, as opposed to a human operator, is to control such operations.

The computer 104 is generally arranged for communications on the vehicle communication network 114 that can include a bus in the vehicle 102 such as a controller area network CAN or the like, and/or other wired and/or wireless mechanisms. Alternatively or additionally, in cases where the computer 104 actually comprises a plurality of devices, the vehicle communication network 114 may be used for communications between devices represented as the computer 104 in this disclosure. Further, as mentioned below, various controllers and/or sensors 106 may provide data to the computer 104 via the vehicle communication network 114.

Via the vehicle network 114, the computer 104 may transmit messages to various devices and/or components in the vehicle 102 and/or receive messages (e.g., CAN messages) from the various devices and/or components (e.g., sensors 106, ECUs, audio output device 110s, etc.) Alternatively, or additionally, in cases where the computer 104 actually comprises a plurality of devices, the vehicle communication network 114 may be used for communications between devices represented as the computer 104 in this disclosure. Further, as mentioned below, various controllers and/or sensors 106 may provide data to the computer 104 via the vehicle communication network 114.

The vehicle 102 typically includes a variety of sensors 106. A sensor 106 is a device that can obtain one or more measurements of one or more physical phenomena. Some sensors 106 detect internal states of the vehicle 102, for example, wheel speed, wheel orientation, and engine and transmission variables. Some sensors 106 detect the position or orientation of the vehicle 102, for example, global positioning system GPS sensors. Some sensors 106 detect objects, for example, radar sensors, scanning laser range finders, light detection and ranging LIDAR devices, and image processing sensors such as cameras. Further sensors 106 detect sounds, for example, dynamic or condenser microphones, piezoelectric transducers, ultrasonic sensors, acoustic emission sensors, etc.

The vehicle 102 may include one or more displays 108. Displays 108 display visual data, e.g., two-dimensional visual data, to users of a vehicle 102. The displays 108 can be any suitable type(s) for displaying content legible to the respective occupants, e.g., light-emitting diode (LED), organic light-emitting diode (OLED), liquid crystal display (LCD), plasma, digital light processing technology (DLPT), etc. Displays 108 can display visual data in monochrome or color via a screen and the visual data can be updated at a frame rate, which can be 60 frames per second, for example. Displayed visual data can be a static image, where the majority of the two-dimensional area does not change from frame to frame, or a dynamic image, where the majority of the two dimensional area changes from frame to frame. Visual data to be displayed on a display 108 can be generated by a display controller. The display controller is a computing device such as an ECU or the like that can receive data to be displayed on the display(s) 108 in a visual format from computer 104, other vehicle ECUs, or from an external computing device 118 via server 116.

A display 108 may allow for user input in addition to providing output. For example, the display 108 may be a suitable touchscreen display, such that a user may provide input to the computer 104 via the display screen 108 (e.g., a set of data to be outputted by the display 108 may be selected via the display screen 108). The user may provide input to the computer 104 via the display 108. The touchscreen may be any suitable type for receiving an input from a user (e.g., resistive, capacitive, infrared, etc.).

Vehicle components may include audio output devices 110 as well as displays 108. The audio output devices 110 can be any suitable device configured to output sound to users of the vehicle 102. For example, audio output devices 110 may be speakers, a personal device such as headphones, etc. Speakers are electroacoustic transducers that convert an electrical signal into sound. The speakers can be any suitable type for producing sound audible to the respective user (e.g., dynamic). The personal device may be any suitable device for emitting sound to a single user, e.g., headphones such as in-ear or over-the-ear, a portable speaker, etc. The personal device may be connected to the vehicle network 114 via a wired connection such as an audio jack or a wireless connection such as Bluetooth™.

Figure 2:
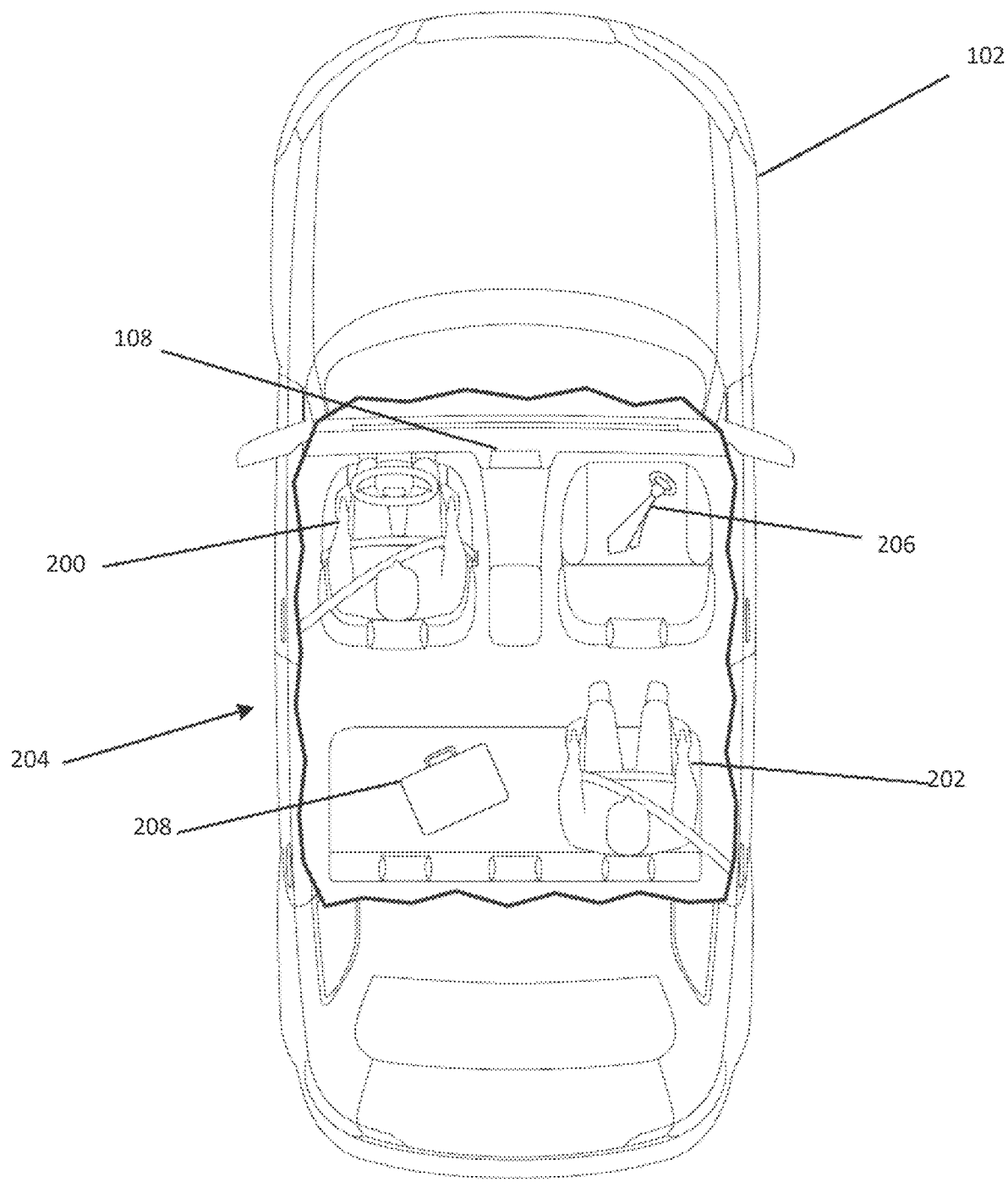
FIG. 2 is a top diagrammatic view of the vehicle with the passenger cabin exposed for illustration.

With reference to FIG. 2, a passenger cabin 204 of the vehicle 102 is shown. The passenger cabin 204 can house one or more vehicle 102 occupants, such as users 200, 202 illustrated in FIG. 2. The passenger cabin 204 includes one or more cabin positions (e.g., one or more of the cabin positions disposed in a front row of the passenger cabin 204 and one or more of the cabin positions disposed in a second row behind the front row). The passenger cabin 204 may also include cabin positions in a third row (not shown) at a rear of the passenger cabin 204. In the illustrated example, user 200 is located in an operator's position and user 202 is located in a rear right position of the cabin 204.

The passenger cabin 204 may include none, one, or more objects, such as the illustrated objects 206, 208. As used herein, an object is a collection of physical matter that forms a single thing. In the current example, the objects 206, 208 are a necktie and a briefcase respectively, but could be any object that could be placed in the cabin 204. The object may be detected by a vehicle sensor.

The computer 104 may classify the object 206, 208 based on data collected by the sensors 106. Classifying the object 206, 208 means determining a type or category of the object 206, 208 according to any suitable technique. For example, various techniques can be used to analyze data from cameras or other sensors 106 to determine a type or category of the object 206, 208. A type or category of the object 206, 208 means a kind of object (e.g., a suitcase, a necktie, a pet carrier, a folded bicycle, etc.) Image data used for object classification may be one image or a plurality of images collected at different times. Image data could further be used by the computer 104 to identify an occupant of a cabin 204 who owns an object 206, 208 (e.g. the user who carried the object 206, 208 into the vehicle). The computer 104 may alternatively or additionally determine the presence of the object in the interior of the vehicle based on user input. For example, the user 200, 202 may specify to the computer 104 that they have a briefcase with them via the display 108.

A classifier could include a neural network trained in a suitable manner to classify objects 206, 208. In training a deep neural network, a training dataset that includes example objects 206, 208 may be used. The training dataset can include many (e.g., thousands) of example images labeled to indicate a type of object 206, 208 in the image. Once trained, the neural network could be implemented in a vehicle computer 104 and used to classify objects.

As mentioned above, the computer 104 could be programmed to, in addition to classifying an object 206, 208, also identify a user 200, 202 associated with the object 206, 208. A user 200, 202 associated with an object may be determined based on that user 200, 202 bringing the object 206, 208 into the cabin 204, and may be expected to take the object when they leave the cabin 204. The computer 104 may detect an object 206, 208 and/or a user 200, 202 based on analysis of data such as image data. The computer 104 may determine that a user 200, 202 is associated with an object 206, 208 when the computer 104 determines, based on data such as image data, that the user 200, 202 touched the object 206, 208 and/or that the user 200, 202 is positioned closer to the object 206, 208 than other users 200, 202. The computer 104 may alternatively or additionally determine object-user associations based on user input (e.g., input specifying an object 206, 208 that belongs to a user 200, 202). Alternatively or additionally, computer 104 could associate a user 200, 202 with an object 206, 208 based on detecting a predetermined relationship, such as a specified distance, between the user 200, 202 and the object 206, 208. For example, the computer 104 may associate an object 206, 208 with the user 200, 202 that is positioned closest to the object 206, 208 within the passenger cabin 204 and/or may associate an object 206, 208 with the user 200, 202 that placed the object 206, 208 within the passenger cabin.

The computer 104 may include a navigation system. The navigation system may be any suitable system for vehicle navigation. The navigation system provides a route to a destination and an estimated time of arrival at the destination. The route may include one or more intermediate destinations (i.e., waypoints) in addition to a terminal or final destination. Waypoints may be "pick up" or "drop off" locations specified by the users 200, 202, for example, and may have respective estimated times of arrival.

The users 200, 202 may rest (e.g., sleep) in the passenger cabin 204. In some examples, when a vehicle is in an operating mode (e.g., moving), users 200, 202 may only rest if they are positioned in any cabin position other than the driver's position or if the vehicle is not in an operating mode (e.g., is parked), although in the future it is contemplated that autonomous vehicle technology may develop to the point where examples may be possible in which a user 200 in an operator's position may rest when the vehicle 102 is in an operating mode. The computer 104 may determine that the user 200, 202 is sleeping based on user input specifying that the user 200, 202 intends to sleep. Alternatively, or additionally, the computer 104 may determine that the user 200, 202 is sleeping based on data collected by the sensors 106. The data may include image data (e.g. the users' eyes being closed), biometric data (e.g. heart rate data, respiration data), etc.

The computer 104 may determine a wakeup time for an occupant of a vehicle based on a destination and an object in an interior of the vehicle, and actuate a vehicle component to awaken the occupant based. The wake-up time is a time when the computer 104 actuates one or more components (e.g. audio output devices 110) to awaken a user or users 200, 202. The wakeup time may be a time that is a specified amount of time prior to another time (e.g. time of arrival at destination). The computer 104 may actuate the display 108 to output light, audio output devices 110 to output audio, further haptic devices, etc. Different resting users 200, 202 may have respective wakeup times. For example, a first user 200 may have a wakeup time of 4:30 pm, and a second user 202 may have a wakeup time of 5:00 pm. The computer 104 may actuate components targeted are positioned to awaken a user 200, 202 at their respective wakeup time. For example, the computer 104 may actuate only an audio output device 110 that is mounted in a position of the vehicle that is closest to the position of the first user 200 in the cabin 204 relative to other audio output devices 110 at a wakeup time of the first user 200.

The computer 104 may determine the wakeup time based on detecting that the user is sleeping (e.g. by detecting closed eyes, decreased heartrate, etc.) or via user input specifying that the user 200, 202 is intending to sleep. When the user 200, 202 informs the computer 104 that the user 200, 202 intends to sleep, the computer 104 may enter a "monitor mode" and begins collecting data (e.g. closed eyes, decreased heartrate, etc.) such that the computer 104 may determine a time when the user 200, 202 falls asleep.

The computer 104 may determine the wakeup time based on a specification by the user 200, 202 (e.g. the user 200, 202 may specify a wakeup time of 4:30 pm). That is, the wakeup time may be a desired difference between the wakeup time and an estimated time of arrival at the destination as input by the user 200, 202. Absent any specified wakeup time by the user 200, 202 the computer 104 may determine the wakeup time for a specific user 200, 202 based on one or more factors. The computer 104 may begin with a baseline wakeup time and adjust the baseline wakeup time based on the one or more factors, for example. The factors will be described in further detail below. The computer 104 may store a lookup table or the like providing time adjustments to make to the baseline wakeup time based on respective factors. The baseline wakeup time for a user 200, 202 may be, for example, ten minutes before time of arrival at the user's destination.

The computer 104 may assign respective adjustments to factors (e.g., to "subtract" a value from the wakeup time corresponding to an amount specified for respective factors). That is, the computer 104 may first specify the baseline wakeup time. The baseline wakeup time may be specified during development of the computer 104. The baseline wakeup time may be, for example, ten minutes prior to a user's specified arrival time (e.g. time of reaching destination, time specified in a personal calendar, etc.). The computer 104 may then adjust the wake up time by applying specified adjustments to the baseline wakeup time.

The computer 104 may apply weights to factors used to determine a wakeup time. A weight in this context means a scalar value by which the factor is multiplied. That is, the computer 104 may increase or decrease an adjustment based on applying a weight to one or more factors used to determine the adjustment. For example, if a destination classification factor has a weight of two, and no other factor being used is weighted, then the weight to the adjustment to be made based on the classification of the destination would be doubled relative to the adjustments for other factors. The computer 104 may assign weights based on user input. For example, a user could provide input that a destination classification of "Work" is assigned a weight of two, while a destination classification of "Home" is assigned a weigh of 0.5 (i.e., one-half). Alternatively or additionally, the computer could assign weights based on stored data. For example, weights could vary based on a time of day. As an example, an occupant state factor indicating deep sleep (e.g., an NREM state as discussed below) could be given a higher weight (e.g., two) during daytime hours (e.g., 7:00 AM to 8:00 PM) and a lower weight (e.g., one) during even hours (e.g., 8:01 PM-6:59 AM).

An example expression that the computer 104 may use to calculate priority score is represented by equation 1:

$$\text{Wakeup Time} = (\text{Arrival Time} - 10) - F1 - (F2/2) - F3 - \ldots - FN \qquad \text{Equation 1:}$$

where F refers to the adjustments to be made based on respective factors as specified by the lookup table (e.g., one minute per small object associated with the user, fifteen minutes for time to walk to destination after exiting vehicle, etc.) F2 is given a weight of one-half and other factors are unweighted or, put another way, receive a default weight of one.

The computer 104 may adjust the wakeup time based on classification of an object 206, 208. That is, the computer 104 may adjust the wakeup time based on classifications of objects 206, 208 that the user 200, 202 is associated with. The computer 104 may store predetermined adjustments to apply to the baseline wakeup time corresponding to different classifications. The adjustments may be stored in a lookup table and may be determined empirically based on how long it takes a test user 200, 202 to collect an object 206, 208 of a specific classification before exiting the vehicle 102. For example, after determining that the user 200 is associated with an object 206, the computer 104 may adjust the wakeup time by increasing the difference between it and the arrival time by two minutes based on classifying the object 206 as a necktie, thereby giving the user 200 an appropriate amount of time to put on the necktie before exiting the vehicle 102. As another example, the computer 104 may adjust the wakeup time by three minutes based on the object 208 being classified as a briefcase.

In addition to adjusting the wakeup time based on factors determined by the computer 104, the computer 104 may adjust the wakeup time based on conditions specified by user input. Conditions specified by user input means any factor that may or may not be determined by the computer 104, but which is specifically input to the computer 104 by a user 200, 202. Conditions specified by the user may include specific factors which leave the time adjustment to be determined by the computer 104 (e.g. based on a lookup table). Conditions specified by the user may further include a specific adjustment to make to the wakeup time. For example, the user 200 may specify to the computer 104 that the user 200 is taking a test at their destination, and therefore needs an additional ten minutes to prepare before exiting the vehicle 102. The computer 104 may then adjust the wakeup time a further ten minutes (e.g. if the wakeup time was 15 minutes before arrival, it is adjusted to be 25 minutes before arrival).

The computer 104 may adjust the wakeup time based on conditions specified by user data obtained from a mobile device 118. That is, the computer 104 may set or adjust the wakeup time based on data stored in a user's mobile device 118 such as dates set in messages, calendar dates, etc. If the user 200, 202 allows the computer 104 to access the mobile device 118, the computer 104 may read through the mobile device 118 for any dates and/or times. The computer 104 may set baseline wakeup times to be, for example, ten minutes ahead of the date indicated by the data. The computer 104 may then adjust the wakeup time based on the factors described herein. The computer 104 may retrieve a data set such as a lookup table specifying adjustments to make to the wakeup time based on the user data. For example, the data set may specify that dates relating to meetings during specified time of day (e.g., a lunch or other meal time such as 11:30 AM to 1:30 PM) result in adjusting the wakeup time by thirty minutes, whereas dates relating to school events result in adjusting the wakeup time by thirty minutes. The adjustments to be made based on the data may be specified by users 200, 202 to the computer 104.

The computer 104 may adjust the wakeup time based on occupant state. "Occupant state" means a condition specific to a user 200, 202 that may affect an amount of time the user 200, 202 needs to exit the vehicle 102. Examples of occupant state data could include an object-user association, an occupant wake or sleep state, an occupant destination, an occupant activity at a destination, etc. Occupant state data can be determined according to various sources, such as vehicle sensors 106, an occupant mobile device 118 (e.g., storing calendar data or the like), etc. A sleep state is a point of sleep depth in the sleep cycle between NREM (non-rapid eye movement) and REM (rapid eye movement) sleep. A user's sleep state may, for example, be any one of NREM 1, NREM 2, NREM 3, NREM 4, and REM. The computer 104 may detect biometric data about the user 200, 202 (e.g. respiration or heart rate) from the sensors. The computer 104 may determine the sleep state of the user 200, 202 based on the biometric data as well as the time when the user 200, 202 began sleeping and the average length of a human sleep cycle. For example, the computer 104 may determine that, because a user 200 began sleeping sixty minutes ago (where the average sleep cycle is between eighty and one hundred and twenty minutes) and because the user's respiration and heart rate have slowed over time, the user's sleep state is REM.

The computer 104 may adjust the wakeup time based on an occupant state such as a sleep state of the user 200, 202. The computer 104 may store a lookup table or the like specifying adjustments (if any) to make to the wakeup time based on the user's sleep state. The table may specify an adjustment to make to the wakeup time such that the user 200, 202 is awoken when they are in an NREM sleep state as opposed to REM. For example, if the computer 104 determines that the sleep cycle of the user 200, 202 would put the user 200, 202 in REM sleep twenty minutes preceding time of arrival, the computer 104 may adjust the wakeup time to be more than twenty minutes before time of arrival such that the user 200, 202 is awoken from an NREM sleep state.

Alternatively, or additionally, to adjusting the wakeup time based on occupant state, the computer 104 may adjust the wakeup time based on factors such current and/or historical traffic data. For example, the computer 104 may obtain data about a route as the vehicle 102 travels the route one or more times. The data may be obtained by the sensors 106 and/or received from the server 116, and may include data about traffic density (e.g., number of vehicles passing a point on a road per unit of time), construction, events affecting traffic (e.g. sporting events), etc. The computer 104 may average the data about the route to produce average conditions of the route at specific times (e.g. average delays) and adjust the wakeup time based on the average conditions of the route. The adjustment can be rules based or stored in a lookup table. The data may include whether traffic density along the route has exceeded a specified traffic threshold. The traffic threshold may be a value stored by the computer

104. The computer 104 may determine when delays caused by traffic meet or exceed the traffic threshold, and could then adjust the wakeup time. For example, if the planned route is experiencing traffic that exceeds the traffic threshold (e.g. causing a ten minute delay or more) at the planned time of travel, the computer 104 may adjust the wakeup time to correspond to any delays caused by traffic by moving the wakeup time to a later time (e.g., if traffic delays are determined to be ten minutes, a wakeup time could be adjusted to be ten minutes later). As another example, the computer 104 could detect via sensor data that user 200 generally takes a certain amount of time to exit the vehicle 102 at a specific destination such as a the user's place of work. The computer 104 may average the amount of time between the arrival time and the user 200, 202 exiting the vehicle 102 and adjust the wakeup time by the calculated average. For example, if the user typically took between five and ten minutes to exit the vehicle, an average exit time might be seven minutes, which could then be an amount of an adjustment to the wakeup time.

The computer 104 may adjust the wakeup time based on the destination. Determining the wakeup time based on the destination can include predicting a time of arrival at the destination. That is, as described above, the wakeup time may be determined as a difference from the time of arrival. The wakeup time may be a determined amount of time before the time of arrival. The computer 104 determines the difference between the wakeup time and the time of arrival at the destination based on adjusting a baseline wakeup time using specified adjustment corresponding to factors (e.g. object-user association, sleep state, personal data, etc.) described herein.

The computer 104 may adjust the wakeup time based on determining a classification of the destination. That is, the computer 104 may classify destinations and adjust the wakeup time by an amount determined based on the classification of the destination. The classification of the destination may be a category specifying a use of or activity at the destination (e.g. office, school, restaurant, etc.) The computer 104 could determine the classification of a destination based on an identifier associated with location coordinates, a street address, and/or other identifying information, such as the name of the structure (e.g. "Central High School") and/or based on user input specifying the classification of the destination. The adjustment (if any) to be made based on destination classification may be stored in a lookup table or the like. For example, if the computer 104 classifies the destination as a sports field, the lookup table may specify to adjust the wakeup time by ten minutes to give the user 200, 202 time to make any preparations before exiting the vehicle 102 (e.g., finding parking).

The computer 104 may adjust the wakeup time based on predicting a time for preparing for arrival at the destination. That is, the computer 104 may predict an amount of time that a user 200, 202 would require between waking up and exiting the vehicle 102 at specific destinations and adjust the wakeup time based thereon. The computer 104 may predict an amount of time needed to prepare for arrival using, for example, a neural network. The neural network may be trained as described above based on examples of test users 200, 202 preparing to exit vehicles at different destinations. The prediction may be based in part on the classification of the destination (e.g. a park may require more time than a place of work).

The computer 104 may adjust the wakeup time based on a number of occupants in the vehicle. Where more than one user 200, 202 is present in the vehicle 102, the computer 104 may adjust the wakeup time to allow users 200, 202 more time between awaking and exiting the vehicle 102. The adjustment may be specified to the computer 104 by user input and/or by data determined from empirical testing (e.g., during vehicle development) and stored in a lookup table or the like. For example, if the computer 104 detects that there is more than one user 200, 202, the computer 104 may adjust the wakeup time by 2 minutes per user 200, 202. The computer 104 may also adjust the wakeup time of users 200, 202 based on detecting that other occupants are of a certain age (e.g., user input could provide occupant ages and an adjustment could account for infants or elderly persons possibly having other users 200, 202 to assist them in exiting the vehicle 102).

Table 1 represents an example lookup table providing non-limiting examples of user-object associations that the computer 104 may use (alternatively or additionally to other lookup tables such as described herein) to adjust wakeup time:

TABLE 1

| Data | Action |
| --- | --- |
| User has no user-object association. | No wakeup time adjustment. |
| User is associated with a necktie. | Move back wakeup time by two minutes. |
| User is associated with one or more suitcases. | Move back wakeup time by two minutes per suitcase. |
| User is associated with a folded bicycle. | Move back wakeup time by three minutes. |

The computer 104 may disregard adjustments to the wakeup time if the wakeup time meets a specified wakeup time threshold after applying adjustments from only some factors. The wakeup time threshold is a maximum permissible adjustment to be made to the wakeup time. If the computer 104 has applied adjustments to the wakeup time such that the wakeup time has been adjusted to the threshold (e.g. twenty minutes) then the computer 104 may make no further adjustments. The wakeup time threshold may be specified by the user 200, 202 and/or stored by the computer 104. For example, the computer 104 adjusts the wakeup time to be thirty minutes prior to the arrival time of the user 200, 202. The user 200, 202 also is associated with objects 206, 208 which would normally require further adjustments to the wakeup time. However, if the wakeup time threshold is thirty minutes, the computer 104 may disregard any further factors and not adjust the wakeup time any further.

Example Processes

Figure 3:
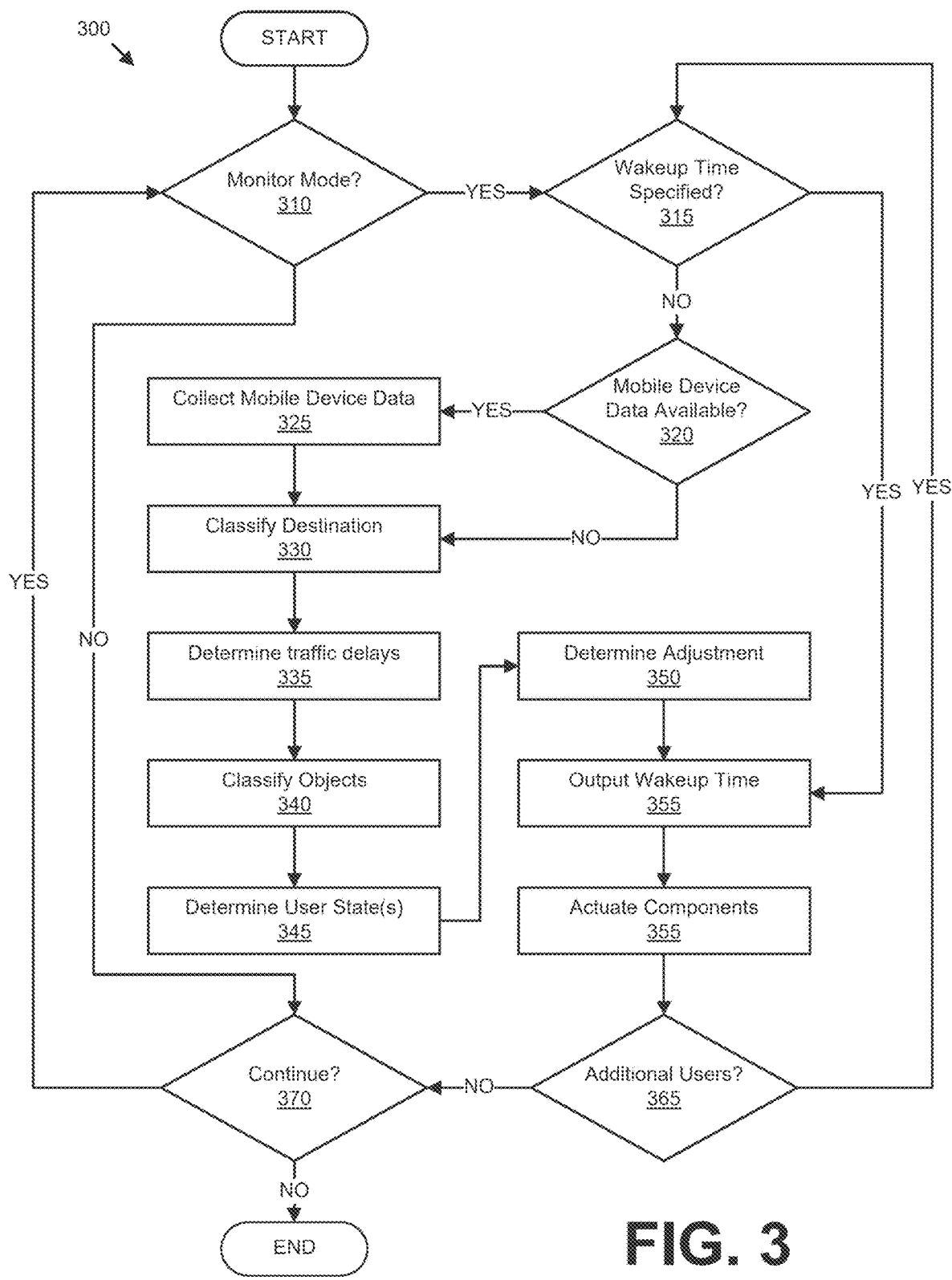
FIG. 3 is a flowchart diagram of an example process to determine a component actuation time.

FIG. 3, described with reference to FIGS. 1 and 2, illustrates an example process 300 for adjusting a wakeup time of a user 200, 202 such that the computer 104 may actuate vehicle components to wake up the user 200, 202 at a desirable time. The process 300 can be carried out according to program instructions executed by the computer 104.

The process 300 beings in a decision block 310 in which the computer 104 determines whether the computer 104 enters a monitor mode. The monitor mode is a mode of operation wherein the computer 104 collects data about the factors described above in order to determine a wakeup time for the user 200, 202. As described above, the computer 104 may enter the monitor mode based on user input indicating that the user intends to sleep. Alternatively or additionally, the computer 104 may also enter a "monitor mode" based on detecting that the user has fallen asleep but not provided input to the computer 104 indicating an intention to sleep. If the computer 104 is in the monitor mode, the process 300 continues to a block 315. Otherwise, the process continues to a block 370.

Next, in a decision block 315, computer then determines whether a wakeup time has been specified; if the process 300 reaches the block 315 it means that the computer 104 has determined that a wakeup output is to be provided because a user has set a wakeup time and/or because the user 200, 202 is sleeping. In the block 315, the computer 104 determines whether the sleeping user 200, 202 has requested to be awoken at a specific time (e.g. at 4:30 pm or fifteen minutes before arrival). If the user 200, 202 has specified a time to be awoken, the process 300 continues to a block 355. Otherwise, the process continues to a block 320.

In the decision block 320, the computer 104, having determined that the sleeping user 200, 202 has not specified a wakeup time, determines whether it has access to data on a mobile device 118 belonging to the user 200, 202. If the computer 104 is allowed access to the mobile device 118, the process continues to a block 325, otherwise the process continues to a block 330.

In a block 325, the computer 104 retrieves any data from the mobile device 118 which indicates appointments and dates and/or times thereof for the user 200, 202 and which would occur within a specified time window around an arrival time. The time window of is a time range, typically determined as a number of minutes before and after the arrival time at a destination. For example, the time window could be thirty minutes, meaning that the time window would encompass from fifteen minutes before the arrival time to fifteen minutes after the arrival time. The time window may be specified by the user 200, 202 or may be a pre-stored value.

Next in a block 330, which may follow the block 320 or the block 325, the computer 104 classifies the destination of the user 200, 202. The destination may be the next destination on a navigation route of the vehicle 102 or, where the user 200, 202 has specified a waypoint, may be a specific destination along a route. The classification of the destination may be a category specifying a use of or activity at the destination (e.g. office, school, restaurant, etc.)

Next, in a block 335, the computer 104 determines whether there is a traffic delay on the navigation route and/or if a delay can be expected based on historic data. The computer 104 further determines a length of the delays.

Next, in a block 340, the computer 104 classifies any objects 206, 208 present in the vehicle and determines any object-user associations.

Next, in a block 345, the computer 104 determines the state of the user 200, 202. As explained above, occupant state means a condition specific to a user 200, 202 that may affect an amount of time the user 200, 202 needs to exit the vehicle 102. For example, determining occupant state may include determining which stage of the human sleep cycle the user 200, 202 is in, as well as what stages the user 200, 202 will be in as time progresses up to the time of arrival at the destination.

Next, in a block 350, the computer 104 determines an adjustment to the wakeup time based thereon according to zero or more factors determined in the blocks 325-345. As described above and illustrated in exemplary equation 1, the computer 104 may store a baseline wakeup time (e.g., an amount of time for a wakeup prior to a time of arrival) and the baseline wakeup time can then be based on the zero or more factors. Respective factors may have associated wakeup time adjustment stored in lookup tables. The adjustments corresponding to the factors may be summed (possibly after being weighted, as described above) to obtain an adjustment to make to the baseline wakeup time. The adjustment may be limited by the specified wakeup time threshold, described above.

Next, in a block 355, the computer 104 outputs the adjusted wakeup time such that vehicle components may be actuated at the time to awaken the user 200, 202.

Next, in a block 360, the computer 104 actuates vehicle components at the wakeup time. The components may be audio devices 110, the display 108, etc. The computer 104 may select the components to actuate based on proximity to the user 200, 202 as described above. The computer 104 may, for example, actuate the components until the user 200, 202, cease actuation after a specified passage of time, or cease actuation after user input.

Next, in decision block 365, the computer 104 determines whether any additional users 200, 202 are sleeping and thus may warrant adjusted wakeup times. If there are additional sleeping users 200, 202, the process returns to block 315 to execute the process for those users 200, 202. Otherwise, the process continues to a block 370.

Next, in the block 370 the computer 104 determines whether to continue the process 300. For example, once the process 300 is initiated, the computer 104 may continue to determine priority rankings by returning to block 310. However, the process 300 may end upon some input or event to terminate the process 300 such as a user 200, 202 ceasing operation of the vehicle 102 (e.g., turning off a propulsion system such as an engine), a user providing input to end the process 300, etc. If the process 300 is to continue, then the process returns to block 310. Otherwise, the process 300 ends.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described. The adjectives "first" and "second" are used throughout this document as identifiers and are not intended to signify importance, order, or quantity. Use of "in response to," "upon determining," etc. indicates a causal relationship, not merely a temporal relationship. Operations, systems, and methods described herein should always be implemented and/or performed in accordance with an applicable user's manual and/or guidelines.

The invention claimed is:

1. A system, comprising a computer having a processor and a memory, the memory storing instructions executable by the processor to:
   determine a wakeup time for an occupant of a vehicle based on a destination and an object in an interior of the vehicle; and
   actuate a vehicle component to awaken the occupant.

2. The system of claim 1, the instructions including further instructions to detect the object by a vehicle sensor.

3. The system of claim 1, the instructions including further instructions to determine a presence of the object in the interior of the vehicle based on user input.

4. The system of claim 1, the instructions including further instructions to determine the wakeup time based on a classification of the object.

5. The system of claim 1, the instructions including further instructions to determine the wakeup time based on a condition specified by user input.

6. The system of claim 1, the instructions including further instructions to determine the wakeup time being based on user input of a desired difference between the wakeup time and an estimated time of arrival at the destination.

7. The system of claim 1, the instructions including further instructions to determine the wakeup time based on a condition specified by user data obtained from a mobile device.

8. The system of claim 1, wherein determining the wakeup time based on the destination includes predicting a time of arrival at the destination.

9. The system of claim 1, wherein determining the wakeup time based on the destination includes predicting a time for preparing for arrival at the destination.

10. The system of claim 1, wherein determining the wakeup time based on the destination includes determining a classification of the destination.

11. The system of claim 1, wherein the occupant is one of a plurality of occupants in the vehicle, the system further comprising determining a second wakeup time for a second occupant in the vehicle.

12. The system of claim 11, wherein the second wakeup time for the second occupant is based on a predicted second time of arrival at a second destination.

13. The system of claim 1, the instructions including further instructions to determine the wakeup time based on a number of occupants in the vehicle.

14. The system of claim 1, wherein the wakeup time is determined further based on one or more of a state of the occupant, traffic data, and historical data.

15. The system of claim 1, wherein the wakeup time is determined further based on a sleep state of the occupant.

16. A method, comprising:
   determining a wakeup time for an occupant of a vehicle based on a destination and an object in an interior of the vehicle; and
   actuating a vehicle component to awaken the occupant.

17. The method of claim 16, further comprising determining the wakeup time based on a classification of the object.

18. The method of claim 16, further comprising determining the wakeup time being based on user input of a desired difference between the wakeup time and an estimated time of arrival at the destination.

19. The method of claim 16, further comprising determining the wakeup time based on a condition specified by user data obtained from a mobile device.

20. The method of claim 16, wherein the occupant is one of a plurality of occupants in the vehicle, the method further comprising determining a second wakeup time for a second occupant in the vehicle.

* * * * *